United States Patent
Reddy et al.

(10) Patent No.: US 8,521,962 B2
(45) Date of Patent: Aug. 27, 2013

(54) MANAGING COUNTER SATURATION IN A FILTER

(75) Inventors: Vimal K. Reddy, Raleigh, NC (US); Mike W. Morrow, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 887 days.

(21) Appl. No.: 12/551,775

(22) Filed: Sep. 1, 2009

(65) Prior Publication Data

US 2011/0055489 A1 Mar. 3, 2011

(51) Int. Cl.
*G06F 12/00* (2006.01)

(52) U.S. Cl.
USPC ............................. 711/141; 711/146

(58) Field of Classification Search
None
See application file for complete search history.

(56) References Cited

U.S. PATENT DOCUMENTS

| | | | |
|---|---|---|---|
| 6,857,048 B2 * | 2/2005 | Rankin et al. | 711/133 |
| 2008/0209133 A1 * | 8/2008 | Ozer et al. | 711/146 |
| 2008/0256094 A1 | 10/2008 | Gupta et al. | |
| 2009/0234980 A1 * | 9/2009 | Barrenscheen et al. | 710/18 |

OTHER PUBLICATIONS

International Search Report—PCT/US2010/047534—ISA/EPO—Dec. 28, 2010.
Moshovos A., et al.,"JETTY: filtering snoops for reduced energy consumption in SMP servers" High-Performance Computer Architecture, 2001. HPCA. The Seventh Intern Ational Symposium on Monterrey, Mexico Jan. 19-24, 2001, Los Alamitos, CA, USA,IEEE Comput. soc, US, pp. 85-96, XP010531677, DOI : DOI : 10.1109/HPCA. 2001.903254 ISBN: 978-0-7695-1019-4.
Peir J.K., et al.,"Bloom Filtering Cache Misses for Accurate Data Speculation and Prefetching" Conference Proceedings of the 2002 International Conference on Supercomputing. ICS02. New York, NY, Jun. 22-26, 2002; [ACM International Conference on Supercomputing], New York, NY : ACM, US, vol . Conf. 16, pp. 189-198, XP001171515, DOI : DOI : 10.1145/514191.514219 ISBN: 978-1-58113-483-4.
Written Opinion—PCT/US2010/047534—ISA/EPO—Dec. 28, 2010.

* cited by examiner

*Primary Examiner* — Reginald Bragdon
*Assistant Examiner* — Baboucarr Faal
(74) *Attorney, Agent, or Firm* — Nicholas J. Pauley; Sam Talpalatsky; Joseph Agusta (57) ABSTRACT

Filters and methods for managing presence counter saturation are disclosed. The filters can be coupled to a collection of items and maintain information for determining a potential presence of an identified item in the collection of items. The filter includes a filter controller and one or more mapping functions. Each mapping function has a plurality of counters associated with the respective mapping function. When a membership status of an item in the collection of items changes, the filter receives a membership change notification including an identifier identifying the item. Each mapping function processes the identifier to identify a particular counter associated with the respective mapping function. If a particular counter has reached a predetermined value, a request including a reference to the particular counter is sent to the collection of items. The filter receives a response to the request and modifies the particular counter as a result of the response.

66 Claims, 8 Drawing Sheets

MANAGING COUNTER SATURATION IN A FILTER

BACKGROUND

I. Field of the Disclosure

The technology of the disclosure relates to filters for determining membership of an item in a collection of items, such as cache lines stored in a cache memory, for example.

II. Background

Cache memory is used to store a subset of items contained in a larger, primary memory. Cache memory offers faster access to data than a primary memory, but cache memory is more costly to implement than a primary memory. Consequently, a cache memory is usually smaller than the associated primary memory.

A primary memory may have multiple associated cache memories. Thus, data associated with the same primary memory location may be stored in more than one cache memory at a time. In this scenario, a cache coherency mechanism is used to ensure that different cache memories do not contain different data associated with the same primary memory location. One such mechanism involves each respective cache memory sending a notification, sometimes referred to as a "snoop probe," to all other cache memories upon the occurrence of a particular event, such as a modification to data contained in the respective cache memory. A snoop probe commonly includes an identifier identifying a particular memory location of the data that has been modified. Each cache memory that receives the snoop probe then determines whether that memory location is contained within the respective cache. As the number of cache memories associated with a primary memory increases, the number of snoop probes increases.

Accessing cache memory to determine the presence of an identified memory location can be time-consuming and processor intensive, increasing power utilization of an associated cache controller. Consequently, cache memories have associated filter mechanisms to filter out snoop probes that identify a memory location that is not contained within the respective cache memory. One such filter mechanism that can be used for cache memory is a Bloom filter. Bloom filters are advantageous in that they provide a relatively fast mechanism for determining presence of a memory address in a collection without returning false negatives. A Bloom filter may include a number of mapping functions, each of which has an associated array of counters. When data is stored in the associated cache memory, the memory location of the data is also provided to the Bloom filter. Each mapping function processes the memory location to map the memory location to a respective counter, which is then incremented. When data is removed or invalidated in the associated cache memory, the memory location of the affected data is provided to the Bloom filter. Each mapping function processes the memory location to map the memory location to the appropriate counter that was incremented when a cache line was added to the cache memory. The respective counters are then decremented. The mapping functions may map multiple memory locations to the same counter.

Upon receipt of a snoop probe from another cache memory, each mapping function processes the identified memory location to determine a respective counter. If any of the counters to which the memory location is mapped are zero, the particular mapped memory location is not contained in the associated cache memory, and the Bloom filter need not forward the snoop probe to the cache memory. However, if each of the counters mapped to an identified memory location has a non-zero value, the identified memory location may be contained in the associated cache memory. Thus, the Bloom filter forwards the snoop probe to the cache memory for determination of whether or not the identified memory location is contained in the cache memory. Therefore, the Bloom filter provides a relatively fast mechanism for filtering out snoop probes associated with memory locations that cannot be contained in the cache memory, reducing power consumption of the cache memory. A Bloom filter may return a false positive result that erroneously indicates that a memory location is contained in a cache memory. However, a Bloom filter may not return a false negative that erroneously indicates that an identified memory location is not contained in a cache memory.

Because the mapping functions in a Bloom filter may map more than one memory location to the same counter, the counters must be of sufficient size to track all memory locations that can be mapped to a counter. Otherwise, the counters could be incremented past their maximum or saturation value and contain an invalid value where the counters can no longer be relied upon. As a result, the filter could generate false negatives and jeopardize cache coherency. Providing counters of a size sufficient to properly track all possible memory locations mapped to counters in a filter incurs cost and requires devoting area on a semiconductor die and/or integrated circuit. Reducing area dedicated to cache memory may be particularly desired for small and/or portable computer processing unit (CPU)-based devices.

SUMMARY OF THE DISCLOSURE

Embodiments disclosed in the detailed description include filters and related methods that can use a smaller membership counter size than would otherwise be necessary to track all locations in a collection of items. In this regard, filters for determining potential membership of an item in a collection of items are disclosed. The filter is coupled to a collection of items and maintains information for determining a potential presence of an identified item in the collection of items. For example, the collection of items may comprise data stored in a cache memory. The filter includes a filter controller and one or more mapping functions. Each mapping function has a plurality of counters. When a membership status of an item in the collection of items changes, the filter receives a membership change notification including an identifier identifying the item. Each mapping function processes the identifier to identify a particular counter associated with the respective mapping function. If a particular counter reached a predetermined value, such as a saturation value as an example, a request including a reference to the particular counter is sent to the collection of items. The filter receives a response to the request and modifies the particular counter in response to the response. The filters of the present disclosure can manage counter saturation in a manner that enables the use of relatively small counters, reducing counter memory requirements.

In one embodiment, the filter manages counter saturation by ensuring that the addition of an item to the collection of items will not overflow a respective counter. This may be referred to herein as "eager" counter management. The filter receives an input referencing a first item and a status indication indicating a change in membership status of the first item in the collection of items. For example, the status indication may be an indication that an item is being added to the collection of items. The filter makes a determination that a counter associated with the first item reached a predetermined value, for example, a maximum value that can be contained by the counter, also referred to herein as a saturation value.

The filter then sends a request including a reference to the saturated counter to the collection of items. The request may be a request to delete a second item in the collection of items that map to the counter. The filter receives a first response from the collection of items that includes a request to delete a second item in the collection of items that is associated with the respective counter. The filter deletes the second item, and in the process decrements the respective counter below the saturation value. The filter can then add the first item to the filter without overflowing the counter.

In another embodiment, the filter manages counter saturation by setting a saturation bit associated with the counter upon determining that the counter has reached a saturation value, and thereafter preventing the counter from overflowing or underflowing as items are added or removed from the filter. Such management may be referred to herein as "lazy" counter management. In this regard, the filter receives an input referencing a first item and a status indication indicating a change in membership status of the first item in the collection of items. The filter makes a determination that a counter associated with the first item reached a predetermined value, for example, a saturation value. The filter sets a saturation bit associated with the counter to indicate that that counter is at a saturation value. The filter thereafter does not increment the counter if the saturation bit is set, but continues to decrement the counter upon notification that items which map to the counter have been deleted from the collection of items.

Thereafter, if the filter receives an input referencing an item in the collection of items and a status indication that the item is being deleted from the collection of items, the filter determines if the respective counter has reached a predetermined minimum value, such as a value of zero. If so, the filter sends a request including a reference to the counter to the collection of items for a count of the number of items in the collection of items that map to the counter. The filter receives a first response from the collection of items in response to the request that includes the count of the items in the collection of items that map to the respective counter. If the count exceeds the saturation value, the filter sets the value of the counter to the count provided by the collection of items, and keeps the saturation bit set. If the count is less than the saturation value, the filter sets the value of the counter to the count provided by the collection of items, and resets the saturation bit. The counter can thereafter be incremented and decremented as appropriate, until the counter again reaches the saturation value.

DETAILED DESCRIPTION

With reference now to the drawing figures, several exemplary embodiments of the present disclosure are described.

The word "exemplary" is used herein to mean "serving as an example, instance, or illustration." Any embodiment described herein as "exemplary" is not necessarily to be construed as preferred or advantageous over other embodiments.

Embodiments disclosed in the detailed description include filters and related methods that can use a smaller membership counter size than would otherwise be necessary to track all locations in a collection of items. In this regard, filters for determining potential membership of an item in a collection of items are disclosed. The filter is coupled to a collection of items and maintains information for determining a potential presence of an identified item in the collection of items. For example, the collection of items may comprise data stored in a cache memory. The filter includes a filter controller and one or more mapping functions. Each mapping function has a plurality of counters associated with the respective mapping function. When a membership status of an item in the collection of items changes, the filter receives a membership change notification including an identifier identifying the item. Each mapping function processes the identifier to identify a particular counter associated with the respective mapping function. If a particular counter reached a predetermined value, such as a saturation value as an example, a request including a reference to the particular counter is sent to the collection of items. The filter receives a response to the request and modifies the particular counter in response to the response. The filters of the present disclosure manage counter saturation in a manner that requires relatively small counters, reducing counter memory requirements.

Embodiments will be presented herein in the context of a cache memory filter, where an access to the cache memory is first filtered to determine whether an identified memory address is potentially contained in the cache memory. If not, the cache memory is not notified of the attempted access, reducing power utilization of the cache memory and increasing cache memory performance. While examples herein use a cache memory for purposes of illustration, it will be understood that the principles of the disclosure can be applied to any mechanism useful in determining potential membership of an item in a collection of items.

Figure 1:
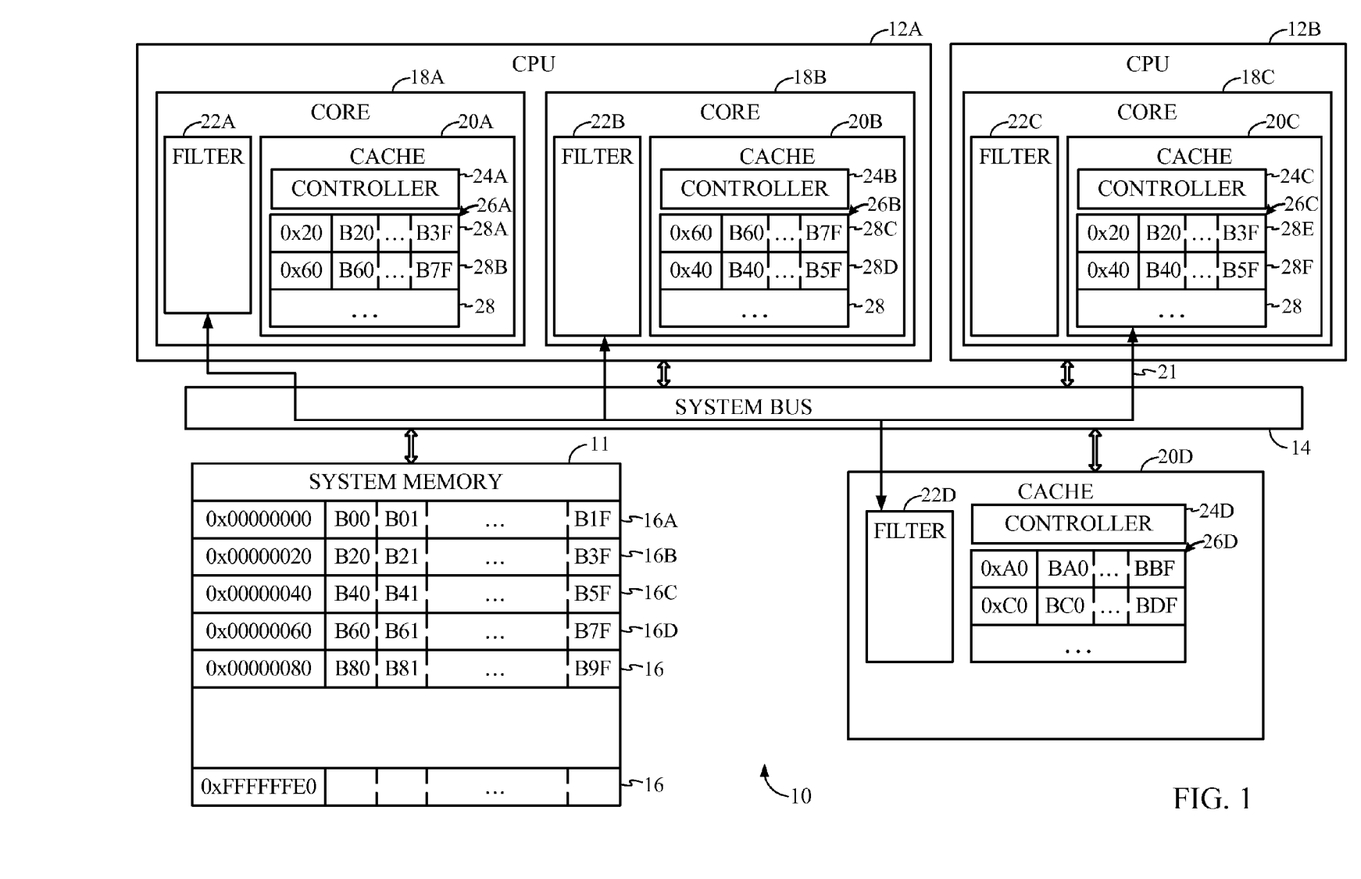
FIG. 1 is a block diagram of an exemplary multiple central processing unit (CPU) system including external and internal caches.
Figure 2:
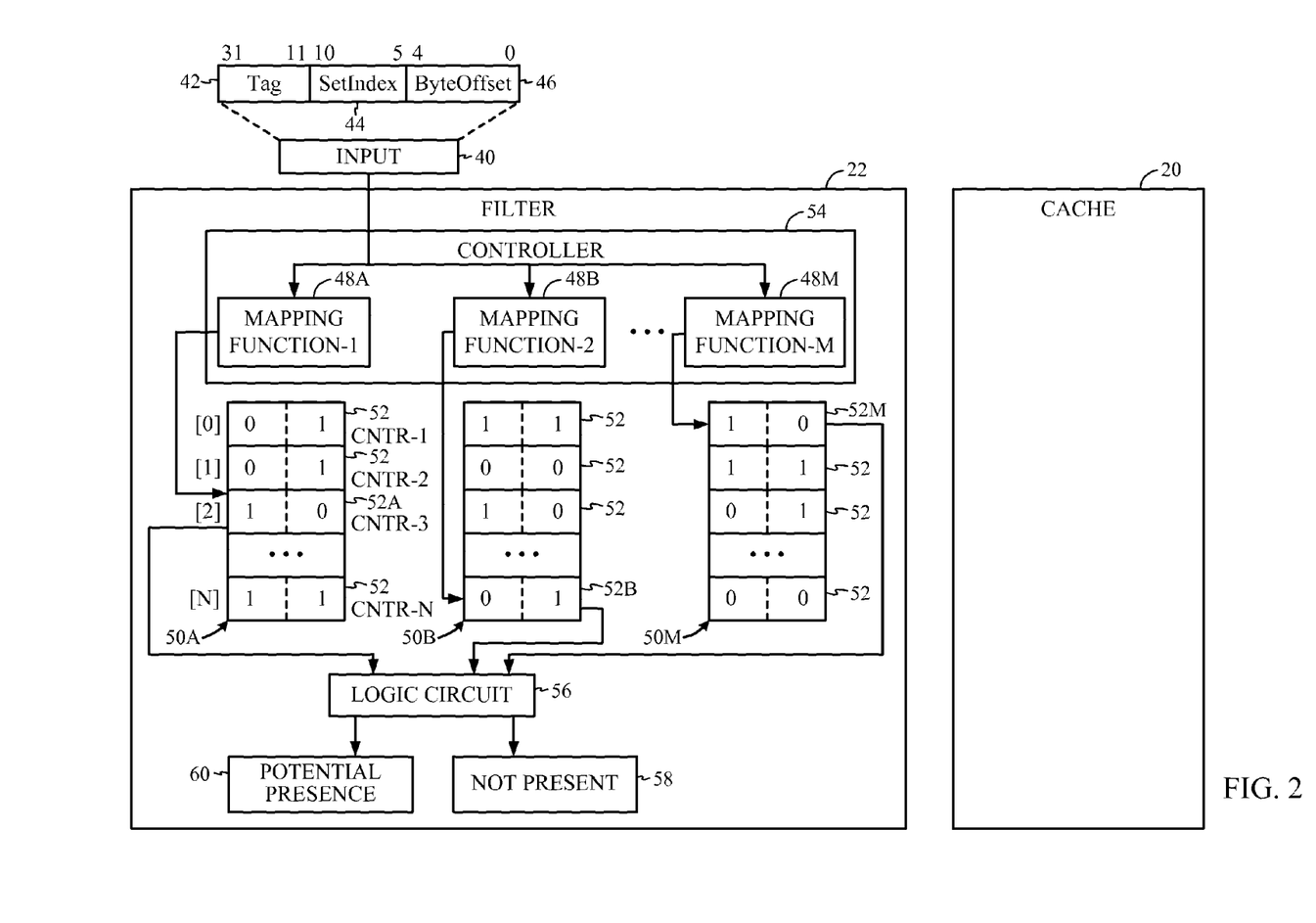
FIG. 2 is a block diagram of an exemplary cache filter and an associated cache.
Figure 3:
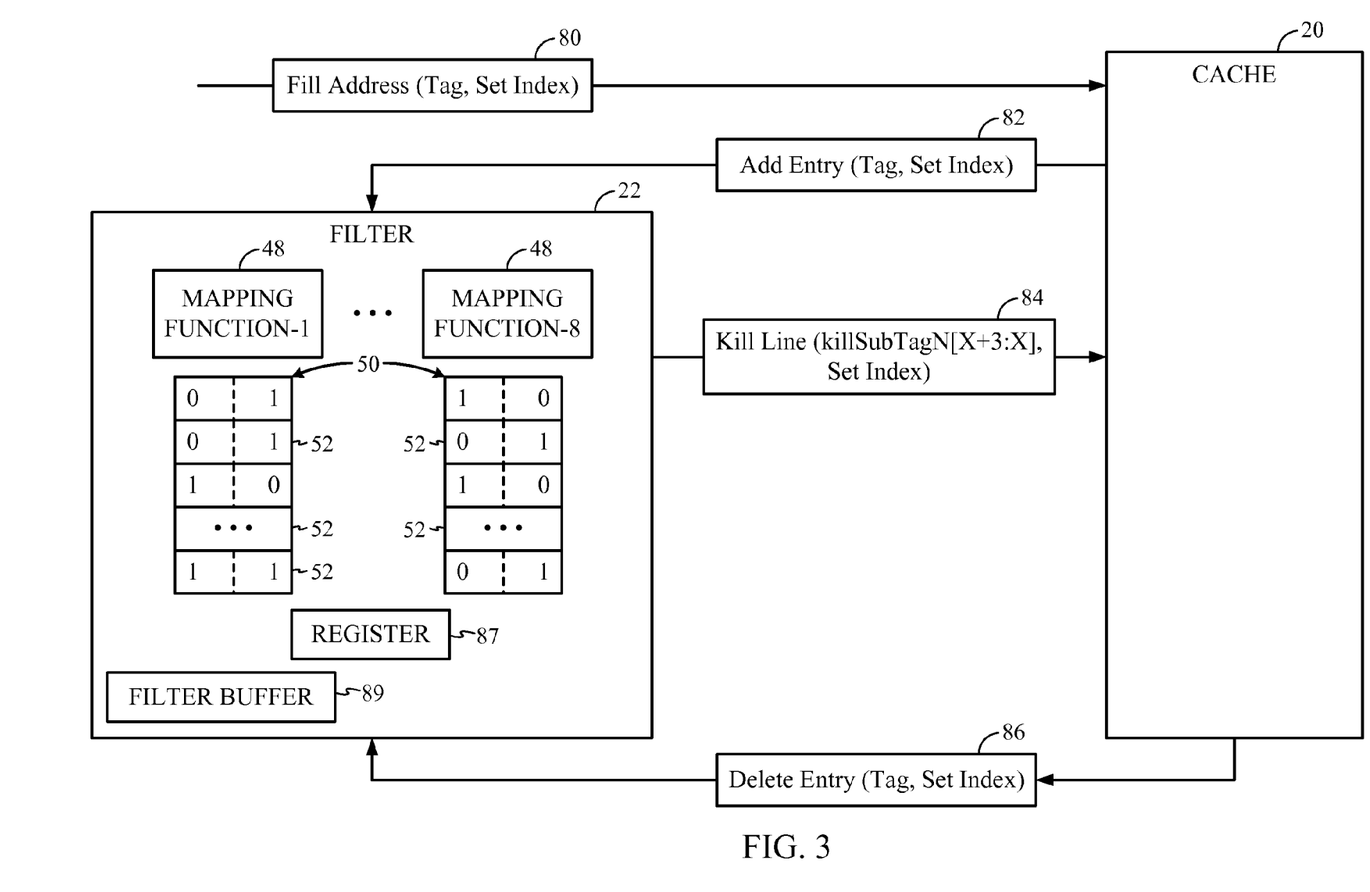
FIG. 3 is a block diagram of an exemplary interface between a cache filter and an associated cache.

Before embodiments of the present disclosure for managing counter saturation are presented starting with FIG. 3, FIGS. 1 and 2 are provided to set forth an exemplary context of caches and cache filters configured to generate, receive, and handle snoop probes to manage cache coherency. FIG. 1 is a block diagram of an exemplary multiple central processing unit (CPU) system including external and internal caches. A system 10 includes a system memory 11 that is coupled to a pair of central processing units (CPUs) 12A, 12B via a system bus 14. The CPUs 12A, 12B may be referred to collectively as the CPUs 12, or individually as the CPU 12, where the discussion is applicable to both or either of the CPUs 12A, 12B. For purposes of illustration, the system memory 11 will be shown as having a capacity of four gigabytes (GB) of memory. Each byte of data in the system memory 11 can be referenced by a unique memory address, but commonly the CPUs 12 read from or write to the system memory 11a predetermined number of bytes at one time. Such predetermined number of bytes will be referred to herein as a memory line. A particular memory line size may be CPU or hardware dependent, but for purposes of illustration herein, it will be assumed that the memory line size is thirty-two (32) bytes of data, as indicated in FIG. 1 as memory lines 16, 16A-16D. Each memory line 16 has an associated line address, as shown in hexadecimal format in FIG. 1. Hexadecimal format will be shown throughout the specification and drawings by preceding the hexadecimal number with the notation "0x." For example, the memory line 16A has a hexadecimal memory address of 0x00000000. The memory line 16A thus contains data having memory addresses 0x00000000 through 0x0000001F. The memory line 16B has a memory address of 0x00000020, and thus contains data having memory addresses 0x00000020 through 0x0000003F.

The CPU 12A is a multiple-core processor, and has a core 18A and a core 18B. The core 18A includes a cache 20A and a cache filter 22A. The cache 20A includes a cache controller 24A and a cache memory 26A. The cache controller 24A manages the cache memory 26A and implements functionality with respect to the cache 20A as described herein. The cache memory 26A is commonly organized into a collection of items, such as a collection of cache lines of data of a predetermined size, as shown in FIG. 1 by cache lines 28, 28A, and 28B. The cache lines 28 are commonly the same size as the memory lines 16, in this example thirty-two (32) bytes long. Each cache line 28 has a cache line address (shown in FIG. 1 in hexadecimal notation), and is a copy of the corresponding memory lines 16 in the system memory 11 having the same memory address. For example, the cache line 28A has a memory address of 0x00000020, which is the same memory address as the memory line 16B of the system memory 11, reflecting that the memory line 16B from the system memory 11 is contained, or "cached," in the cache line 28A of the cache 20A. The core 18B similarly has a cache 20B, a cache filter 22B, a cache controller 24B, and cache memory 26B that contains cache lines 28, 28C and 28D. While the caches 20 are shown separate from the cache filters 22, it will be appreciated that cache filters 22 may be separate from the respective cache 20 with which it is associated, or integral with the respective cache 20.

The CPU 12A and the CPU 12B form a symmetric multiprocessing (SMP) environment wherein the CPUs 12 share the system memory 11. The CPU 12B similarly has a core 18C which has a cache 20C and a cache filter 22C. The cache 20C includes a cache controller 24C and cache memory 26C, which contains cache lines 28, 28E and 28F, each of which is a copy of a memory line 16 from the system memory 11. An external cache 20D is also coupled to the system memory 11 via the system bus 14. The external cache 20D includes a cache controller 24D, a cache filter 22D, and a cache memory 26D. The external cache 20D may by accessible by one or more devices via the system bus 14. Although not illustrated in FIG. 1, it will be appreciated that the CPUs 12 may have additional caches, such as level 2 caches, which similarly have cache controllers, cache filters, and cache lines that contain data from the system memory 11.

The caches 20A-20D enable relatively fast access to data contained therein compared to accessing the system memory 11. However, because a copy of data from the system memory 11 may exist in multiple caches 20 simultaneously, a cache coherency mechanism is needed to ensure that an update to a cache line 28 in one cache 20 is known to other caches 20. For example, the cache line 28B in the cache 20A and the cache line 28C in the cache 20B contain a copy of data from the same memory line 16 of the system memory 11. If the data in the cache line 28C is modified, the cache 20A must invalidate the cache line 28B to ensure that the now invalid data contained in the cache line 28B is not provided to an application executing on the CPU 12A.

One mechanism for implementing cache coherency involves the use of a notification, referred to herein as a "snoop probe." A snoop probe is sent from one cache 20 to other caches that may contain data from the same memory address in order to inform other caches 20 that a particular cache line has been updated. As a result, if the memory address identified in the snoop probe is contained in the cache, the data in the cache identified by the snoop probe is invalidated. Unfortunately, as the number of caches 20 increase, so must the number of snoop probes to ensure coherency among caches. Filters, such as the cache filters 22A-22D, are provided and coupled to the caches 20A-20D, respectively, to determine whether data identified in a snoop probe may or may not be present in the associated cache 20A-20D. If a respective cache filter 22 determines that data identified in a snoop probe cannot exist in a respective cache 20, the cache filter 22 can discard the snoop probe, eliminating the need for the cache 20 to process the snoop probe. If the respective cache filter 22 determines that the data identified in the snoop probe may exist in the associated cache 20, the cache filter 22 can forward the snoop probe to the cache 20. The cache filters 22 provide a relatively rapid determination of potential membership of a particular memory location in a respective cache 20, saving the respective cache 20 from expending power and time that could otherwise be expended servicing reads and writes to the cache 20.

Assume for purposes of illustration that the core 18C modifies data contained in the cache line 28E. The cache 20C sends a snoop probe 21 identifying the memory address associated with the cache line 28E to the cache filters 22A, 22B, and 22D. The cache filters 22B and 22D may determine that the respective caches 20B and 20D do not contain the memory address identified in the snoop probe 21, and thus can discard the snoop probe 21, preventing the snoop probe 21 from being processed by the respective caches 20B and 20D. The cache filter 22A determines that the memory address identified in the snoop probe 21 may exist in the cache 20A, and forwards the snoop probe 21 to the cache 20A for further processing. In this manner, the cache filters 22 can reduce power consumption and increase cache throughput by preventing snoop probes 21 identifying cache lines 28 that cannot be contained in a respective cache 20 from being sent to the respective cache 20.

FIG. 2 is a block diagram of an exemplary cache filter and an associated cache. As each cache line is added to the cache 20, an input 40 identifying or otherwise referencing the respective cache line is provided to the cache filter 22, along with a status indication indicating a particular change in membership associated with the cache line. In the example provided herein, the status indication indicates that the cache line is being added to the cache 20. Where the cache line is being removed, or invalidated, the status indication indicates that the cache line is being removed from the cache 20.

The input 40 references a memory address location identifying a particular byte of memory in the cache line, or identifying the byte of memory at the beginning of the cache line. Assuming a thirty-two (32) bit (i.e., four (4) Gigabyte (GB)) memory, each memory address may comprise thirty-two (32) bits. The input 40 may include a tag field 42 comprising a twenty-one (21) bit tag field 42 extending from bit 31 to bit 11, a six (6) bit set index field 44 extending from bit 10 to bit 5, and a five (5) bit byte offset field 46 extending from bit 4 to bit 0. The cache filter 22 in this example is a Bloom filter that includes a plurality of mapping functions 48A-48M, each of which has an associated counter array 50 containing a plurality of counters 52. While three mapping functions 48 are illustrated in FIG. 2, there may be any number of mapping functions 48, depending on the particular implementation of the cache filter 22. While four counters 52 are shown for each of the counter arrays 50A-50M, there may be any number of counters 52 depending on the particular implementation of the cache filter 22.

Each mapping function 48 maps the input 40 to a particular counter 52 in the respective counter array 50 by applying an algorithm that hashes, or otherwise converts, the input 40 into an index value that can identify a particular counter 52 in the respective counter array 50. Exemplary index values are illustrated to the immediate left of the counter array 50A (e.g., [0], [1], [2], . . . [N]). For example, the mapping function 48A may hash a particular input 40 to an index value of [2], thereby mapping the input 40 to the counter 52A. The mapping function 48B may hash the same input 40 to a different index value that maps the input 40 to the counter 52B. The mapping function 48M may hash the same input 40 to an index value of [0], thereby mapping the input 40 to the counter 52M. Once each mapping function 48 maps the input 40 to a particular counter 52, the respective counter 52 associated with each of the mapping functions 48 is incremented. The cache filter 22 may include a controller 54 that is adapted to implement the mapping functions 48 and additional functionality with respect to the cache filter 22 as described herein. Notably, because the mapping functions 48 map a relatively large value in the input 40 to a relatively small number of counters 52, the mapping functions 48 may map more than one input 40 to the same counter 52 in the respective counter array 50 associated with each mapping function 48. While the counters 52 associated with a respective mapping function 48 are shown as being organized into a counter array 50, it should be apparent that the use of a counter array 50 is only one mechanism for associating a plurality of counters 52 with a respective mapping function 48.

According to one embodiment of the disclosure, the cache 20 is a W-way set associative cache wherein the cache lines in the cache 20 are arranged into a number of sets, with each set capable of containing W cache lines. The particular number of sets in an associated cache can be determined by dividing the total number of cache lines by the number of lines (W) per set, in accordance with the following formula:

Number of sets=total cache lines/W.

For example, assume the cache 20 contains $2^{10}$ (i.e., 1024) cache lines, and is a 16-way associative set. The cache 20 therefore has sixty-four (64) sets, each set containing sixteen (16) cache lines. The associativity of an associated cache may also determine how certain data in the input 40 is used to reference a respective cache line in the cache 20. For example, if the cache 20 contains sixty-four (64) sets, the set index field 44 should be of sufficient bit length to be able to reference up to sixty-four (64) different sets. Thus, the set index field 44 should have a bit length of six (6) bits (i.e., six (6) bits are sufficient to represent sixty-four (64) different sets). The cache 20 uses the set index field 44 to identify a particular set in the cache, and then allocates a particular cache line of the sixteen (16) cache lines in that set to the data associated with the input 40.

According to this embodiment, if a mapping function 48 uses at least as many counters 52 as there are sets, and likewise uses the set index field 44 as part of the index value for mapping an input 40 to a particular counter 52, then each counter 52 can only be associated with the number of cache lines in a particular set. In this present example, therefore, each counter 52 can only be associated with no more than sixteen (16) (W) cache lines. While a mapping function 48 may use any of a variety of methodologies for mapping the input 40 to a particular counter 52, it will be assumed throughout the examples presented herein that a mapping function 48 maps an input 40 to a particular index by using the set index field 44 as the high order bits of a 10-bit index, and four (4) bits from the tag field 42 as the low order bits of the 10-bit index. The particular four (4) bits from the tag field 42 may vary for each mapping function 48, so that each mapping function 48 potentially returns a different index depending on the data in the 4-bit field.

When a cache line is deleted or invalidated in the cache 20, an input 40 identifying the memory address associated with the deleted cache line is provided to the cache filter 22. Each mapping function 48 maps the input 40 to a particular counter 52 in the respective counter array 50, as described above, and decrements the respective counter.

Assume that a snoop probe is sent to the cache filter 22 and the input 40 associated with the snoop probe identifies a memory address that has been modified in another cache (not shown). The input 40 is processed by the mapping functions 48 to map the input 40 to respective counters 52, as described above. Assume that the mapping function 48A maps the input 40 to the counter 52A in the counter array 50A, the mapping function 48B maps the input 40 to the counter 52B in the counter array 50B, and the mapping function 48M maps the input 40 to the counter 52M in the counter array 50M. Assume further that each counter 52 in the counter arrays 50 are two-bit counters, and that the value of the counter 52A is binary '10,' indicating a value of 2; the value of the counter 52B is binary '01,' indicating a value of 1; and the value of the counter 52M is binary '10,' indicating a value of 2. A determination is made by a logic circuit 56 whether each respective counter 52 has a value greater than zero. If any of the counters 52A, 52B, 52M has a value equal to zero, the cache filter 22 makes a determination 58 that the cache line identified in the input 40 cannot exist in the cache 20 because if the cache line existed in the cache 20, the cache filter 22 would have previously incremented the respective counter 52 to a non-zero value when the cache line was added to the cache 20. The cache filter 22 can thus discard the snoop probe and not forward the snoop probe to the cache 20, reducing power utilization by the cache 20 that would otherwise be expended processing a snoop probe identifying a cache line that cannot exist in the cache 20.

In the illustration presented herein, however, the logic circuit 56 determines that each of the counters 52A-52M has a value greater than zero, and thus the cache filter 22 makes a determination 60 that the memory address identified in the input 40 may be present in the cache 20. The snoop probe is forwarded to the cache 20 for additional processing. The cache 20 can determine whether the identified cache line exists in the cache 20 and, if so, invalidate the identified cache line or otherwise process the snoop probe as appropriate.

Because the mapping functions 48 may map more than one input 40 to the same counter 52, the cache filter 22 may make false positive determinations. In other words, the cache filter 22 may determine that a cache line exists in the cache 20 that does not in fact exist in the cache 20. While a false positive determination by the cache filter 22 results in the cache 20 expending unnecessary power to process a snoop probe identifying a cache line that does not exist in the cache 20, memory coherency will ultimately be maintained. However, the cache filter 22 should never make a false negative determination that a cache line is not in the cache 20 that is in fact in the cache 20, because such false negative determination would jeopardize cache coherency.

Since the mapping functions 48 may map more than one input 40 to the same counter 52, the counters 52 are commonly of sufficient size to contain the maximum number of cache lines that may exist in the cache 20. However, using counters 52 of sufficient size so that each counter 52 can contain the maximum number of inputs 40 that may map to a counter 52 requires that a relatively large amount of memory be devoted to the counters 52. For example, assume that the cache 20 has $2^{10}$ cache lines. If each of the counters 52 is eleven (11) bits in size, the counters 52 can never overflow because each of the counters 52 can contain a value of $2^{10}$ without overflowing. Further assume that there are eight (8) mapping functions 48, and the each counter array 50 contains 1,000 counters 52. In such an example, the cache filter 22 must reserve 11,000 bytes of memory for the counters 52 (eight counter arrays*1,000 counters*11 bits per counter), which may be a prohibitive amount of memory.

In accordance with one embodiment of the disclosure, by using the set index field 44 as part of the mapping function 48 to generate an index into each of the counter arrays 50, as described above, each of the counters 52 need only be large enough to contain the maximum number of cache lines in each set. Therefore, for a W-way set associative cache, 1 g(W)+1 bits are needed for each counter 52. In the above example of a 16-way set associative cache, if each of the counters 52 are five (5) bits long (1 g(16)+1), the counters 52 cannot overflow because only sixteen (16) cache lines could map to the respective counter 52.

However, it may be desirable to use even fewer bits than 1 g(W)+1 bits for each counter 52. However, the use of a counter 52 that has too few bits to contain the largest number of cache lines that may map to the counter 52 may result in a counter overflow condition. For example, assume that three (3) cache lines are added to the cache 20, and that the mapping function 48A maps the input 40 identifying each such cache line to the counter 52A, thereby resulting in the counter 52A having a value of binary '11,' which represents a maximum value that can be represented by the counter 52A since the counter 52A is a 2-bit counter. This is sometimes referred to as counter saturation, or a saturation point. Now assume that a fourth cache line is added to the cache 20, and that the mapping function 48A maps the input 40 identifying the fourth cache line to the counter 52A. Incrementing the counter 52A past the maximum value results in a counter overflow condition, and the counter 52A no longer maintains an accurate count of the cache lines in the cache 20 that mapped to the counter 52A. Consequently, the counter 52A can no longer safely be decremented, because decrementing the counter 52A may result in the counter 52A having a binary '00' value that inaccurately reflects that no cache lines map to the counter 52A. Such a situation may lead to false negatives by the cache filter 22, compromising cache coherency.

One mechanism for managing overflow of a counter 52 is to note that the respective counter 52 has overflowed, and thereafter no longer increment or decrement the counter 52. However, such mechanism results in additional false positive determinations by the cache filter 22 because the counter 52 must be treated as a non-zero value. The additional false positive determinations result in the cache 20 expending unnecessary time and power processing snoop probes that identify cache lines that are not present in the cache 20.

Figure 4:
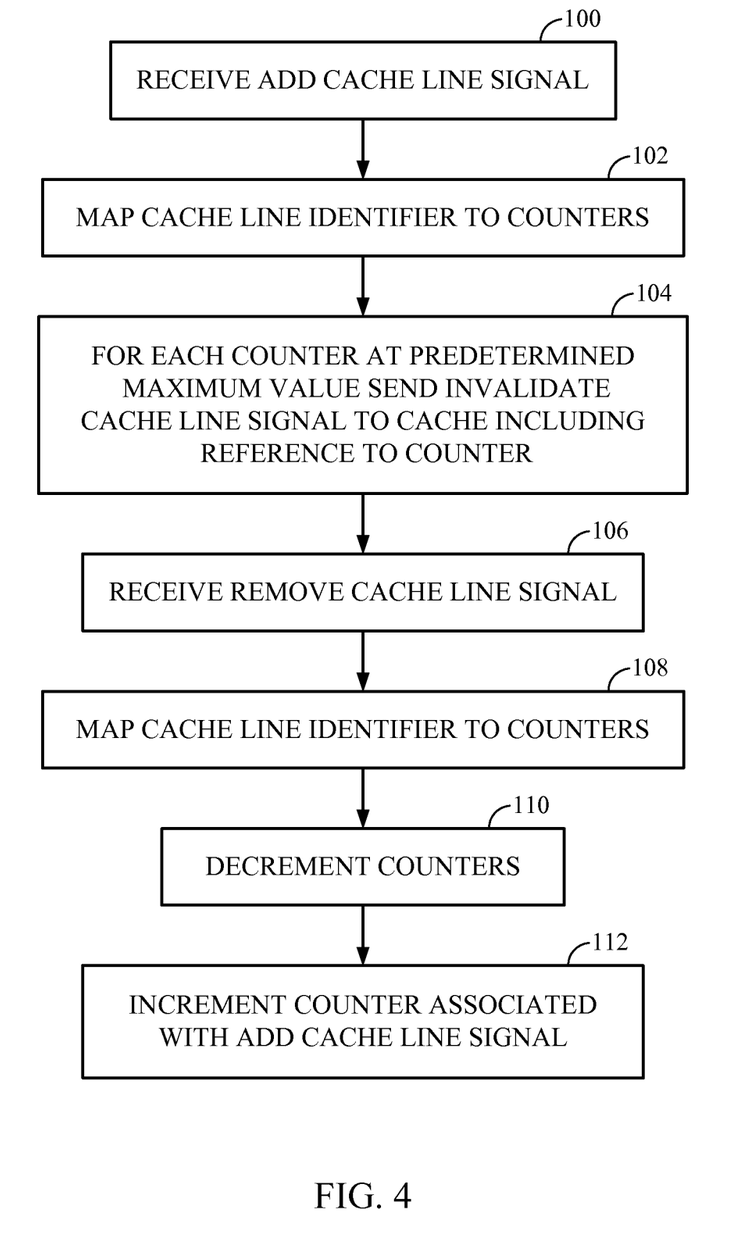
FIG. 4 is a flow chart of an exemplary process for managing filter counter saturation in the cache filter of FIG. 3.

Embodiments of the present disclosure, as discussed starting with FIG. 3, can use counters of relatively small size, substantially reducing memory requirements of the counters 52, by actively managing counter 52 saturation. FIG. 3 is a block diagram of an exemplary interface between a cache filter and an associated cache. FIG. 4 is a flow chart of an exemplary process for managing filter counter saturation in the cache filter of FIG. 3, and will be discussed in conjunction with FIG. 3. Referring first to FIG. 3, assume that the cache 20 is used to cache data from a 32-bit main memory using 32-bit memory addresses, and that the inputs 40 (FIG. 2) identifying relevant memory addresses have a tag field 42 extending from bit 31 to bit 11, a set index field 44 extending from bit 10 to bit 5, and a byte offset field 46 extending from bit 4 to bit 10. Further assume that the cache 20 is a 16-way set associative cache that can contain $2^{10}$ cache lines, with each cache line containing 32 bytes of data. The set index field 44 is used by the cache 20 to select a particular set in the cache 20, and the tag field 42 is used by the cache 20 to identify the respective cache line in the particular set. Because the cache 20 is a 16-way set associative cache, and the cache 20 can contain $2^{10}$ cache lines, the cache 20 is organized into sixty-four (64) sets, with each set containing sixteen (16) cache lines. Assume further that the cache filter 22 contains eight (8) mapping functions 48 (only two of which are illustrated in FIG. 3), and that each mapping function 48 has a counter array 50 containing $2^{10}$ counters 52, and that each counter 52 is a two (2) bit counter. Thus, the cache filter 22 uses 2,048 bytes of memory ($2^{10}$ counters*8 counter arrays*2 bits per counter/8 bits per byte) to filter snoop probes destined for the cache 20. When a cache line is added to the cache 20, a fill address signal 80 including the tag from the tag field 42 and the set index from the set index field 44 of the memory address associated with the cache line is provided to the cache 20. The cache 20 sends an add entry signal 82 including the tag and set index of the cache line to the cache filter 22.

Referring now to FIG. 4, the cache filter 22 receives the add entry signal 82 indicating that a cache line has been added to the cache 20 (block 100). The mapping functions 48 in the cache filter 22 process the tag and set index to map the tag and set index to counters 52 in the counter arrays 50 associated with the respective mapping functions 48, as described with respect to FIG. 2 (block 102). It is determined whether any of the counters 52 are at a predetermined maximum value, such as the saturation point of the counter 52. In the example discussed herein wherein each counter 52 comprises two (2) bits, the predetermined maximum value may be three (3). Assume for the purposes of illustration that one of the counters 52 to which the tag and set index map is at the predetermined maximum value. The cache filter 22 sends a request to the cache 20, illustrated in FIG. 3 as a kill line signal 84, that requests that the cache 20 'kill' or otherwise invalidate a line in the cache 20 that maps to the respective counter 52. The kill line signal 84 includes the same data used by the respective mapping function 48 to identify the counter 52, so that the cache 20 can identify a line in the cache 20 that maps to that respective counter 52. For example, the kill line signal 84 includes the six (6) bit set index field 44, and the particular four (4) bit field of the tag field 42 (illustrated as 'killSubTagN[X+3:X]' in kill line signal 84) used by that respective mapping function 48. The kill line signal 84 thus references the respective counter 52 that is at the saturation value (block 104). The cache 20 uses the set index value and the killSubTagN data to select and invalidate a cache line that maps to the saturated counter 52. The cache 20 initiates, in response to the request, a response comprising the delete entry signal 86 including the tag and set index of the cache line that was invalidated.

The delete entry signal 86 may include updating a memory location, such as a register 87, with the tag and set index of the cache line that was invalidated, and setting the register 87 as valid. The cache filter 22 may await notification that the register 87 contains valid data, and upon such notification or determination, obtain the tag and set index from the register 87 (block 106). The mapping functions 48 can then map the tag and set index of the invalidated cache line to each respective counter 52, including the counter 52 that was at a saturation point (block 108). Each of the counters 52 is then decremented (block 110), thereby modifying each of the counters 52. The counter 52 that was at a predetermined maximum value is now no longer at the predetermined maximum value and can be incremented to reflect the addition of the cache line identified in the add entry signal 82 (block 112). While the cache filter 22 was awaiting notification that the register 87 contains valid data, the cache filter 22 may have been receiving snoop probes, or additional add entry signals 82. Such additional probes or signals may be buffered in a filter buffer 89, or other buffer mechanism, for subsequent processing. As was previously described, when the cache filter 22 is notified that register 87 contains valid data, decrements the counters 52 associated with that cache line. The add entry signal 82 can then increment the counter 52, because cache 20 just removed that cache line from the cache content. It will be appreciated that cache 20 deletes a different line related to the same counter 52 from the current cache 20 content.

Figure 5:
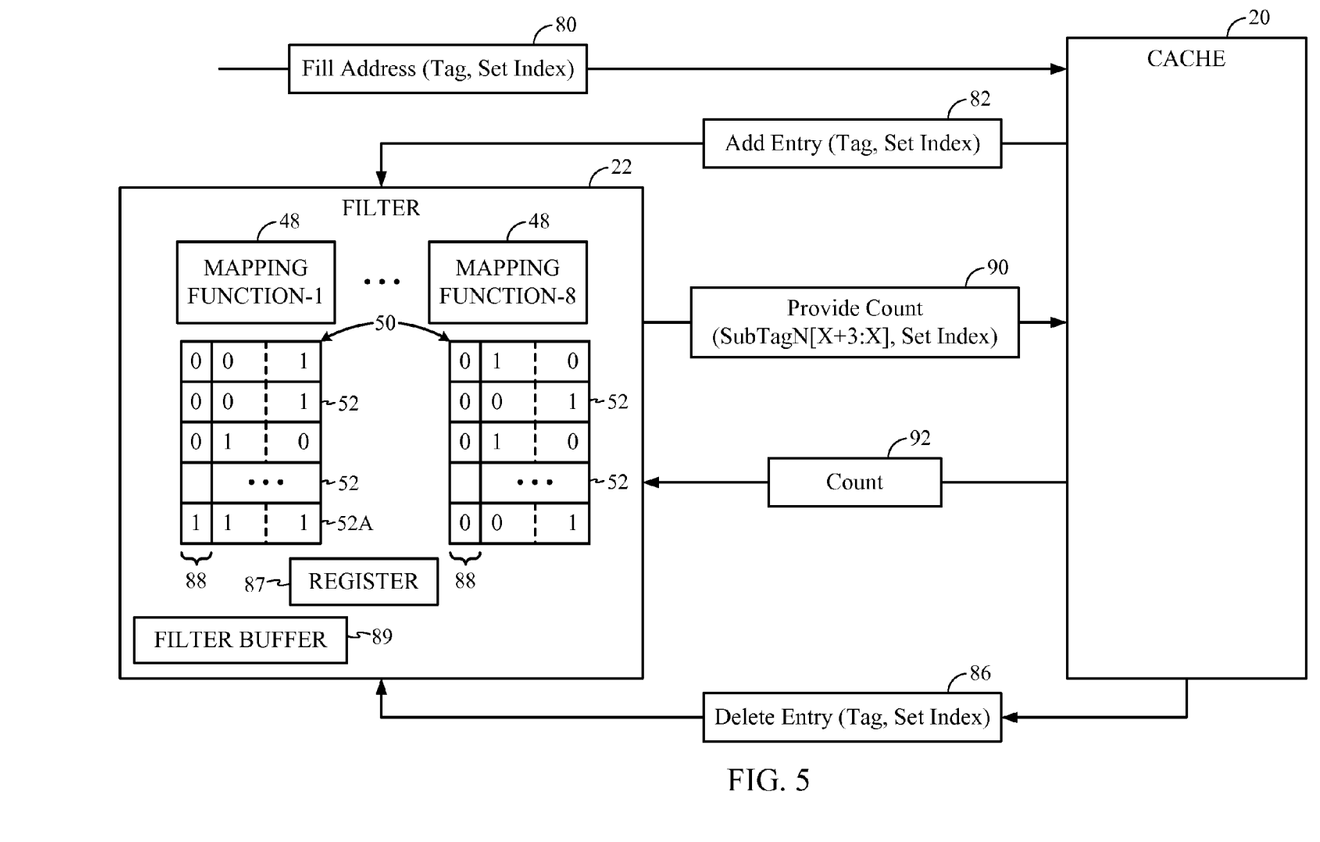
FIG. 5 is a block diagram of another exemplary interface between a cache filter and an associated cache.
Figure 6:
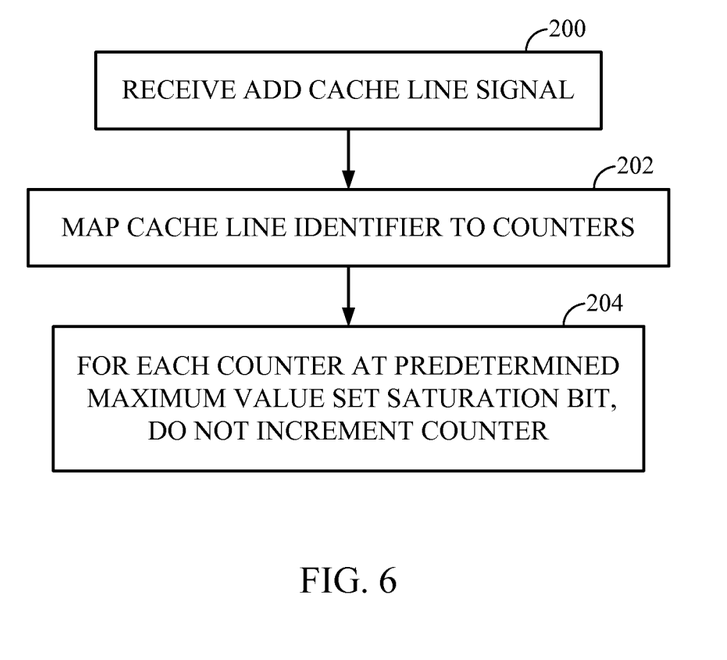
FIGS. 6 and 7 are flow charts of an exemplary process for managing counter saturation in the cache filter of FIG. 5.
Figure 7:
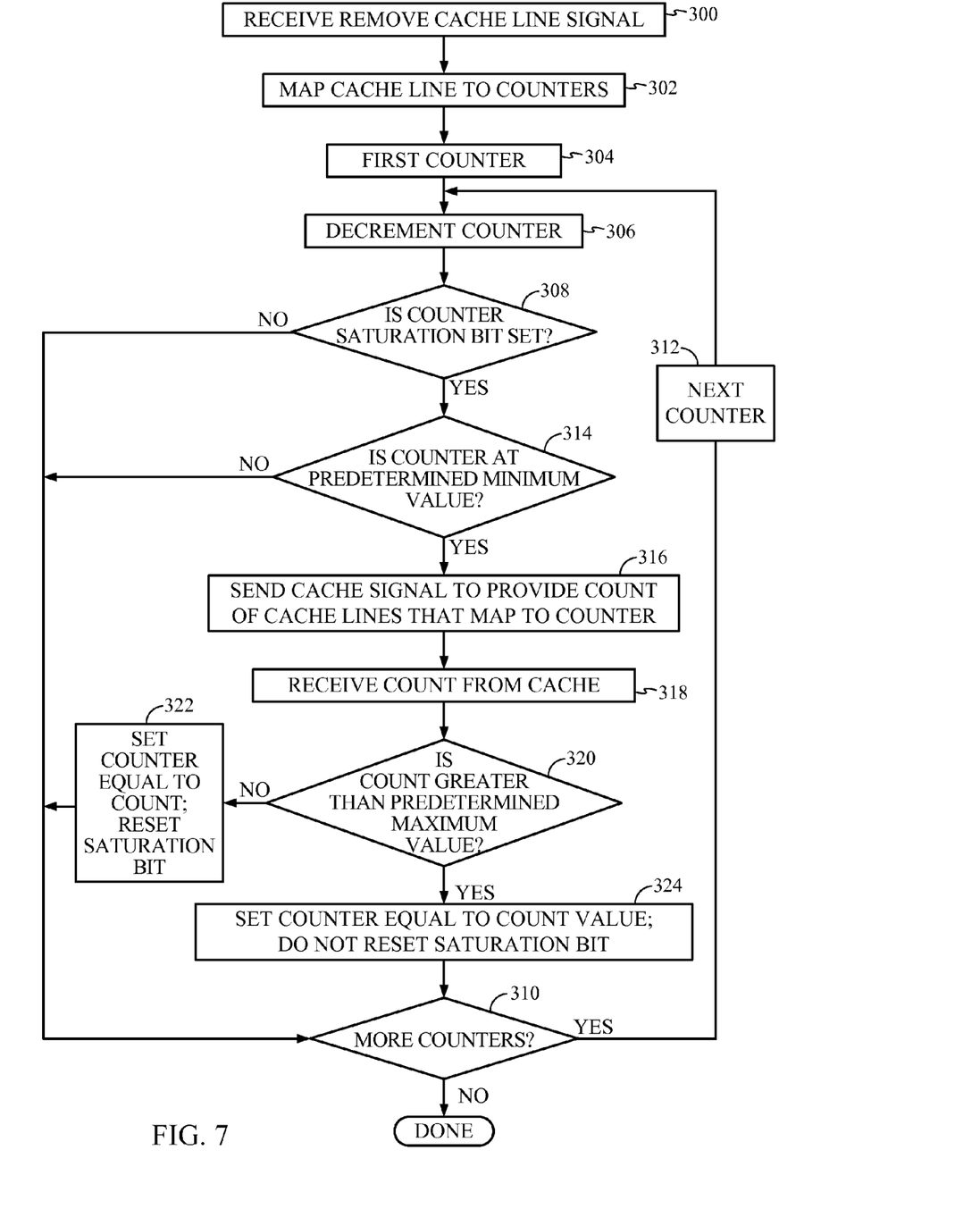

FIG. 5 is a block diagram of another exemplary interface between a cache filter and an associated cache. FIGS. 6 and 7 are flow charts of an exemplary process for managing counter saturation in the cache filter of FIG. 5, and will be discussed in conjunction with FIG. 5. Assume for the purposes of illustration that the cache 20 is associated with a 32-bit main memory using 32-bit memory addresses, and that the inputs 40 (FIG. 2) identifying a relevant memory address have the tag field 42 extending from bit 31 to bit 11, the set index field 44 extending from bit 10 to bit 5, and the byte offset field 48 extending from bit 4 to bit 0. Further assume that the cache 20 is a 16-way set associative cache that can contain $2^{10}$ cache lines, with each cache line containing thirty-two (32) bytes of data. The set index field 44 is used by the cache 20 to select a particular set in the cache 20, and the tag field 42 is used by the cache 20 to identify the respective cache line in the particular set. Because the cache 20 is a 16-way set associative cache, the cache 20 is organized into sixty-four (64) sets, with each set containing sixteen (16) cache lines.

Assume further that the cache filter 22 contains eight (8) mapping functions 48 (only two of which are shown in FIG. 5), and that each mapping function 48 has a counter array 50 containing $2^{10}$ counters 52, and that each counter 52 is a two (2) bit counter. The counter array 50 includes a saturation bit field 88 for each counter 52 for use as described below. Thus, the cache filter 22 uses 3,072 bytes of memory ($2^{10}$ counters*8 counter arrays*(2 bits per counter+1 saturation bit)/8 bits per byte)) to filter snoop probes destined for the cache 20.

When a cache line is added to the cache 20, a fill address signal 80 including the tag from the tag field 42 and the set index from the set index field 44 of the memory address associated with the cache line is provided to the cache 20. The cache 20 sends an add entry signal 82 including the tag and set index of the cache line to the cache filter 22. Referring now to FIG. 6, the cache filter 22 receives the add entry signal 82 indicating that a cache line has been added to the cache 20 (block 200). The mapping functions 48 in the cache filter 22 process the tag and set index to map the tag and set index to counters 52 in the counter arrays 50 associated with the respective mapping functions 48 (block 202). It is determined whether any of the counters 52 are at a predetermined maximum value, such as the saturation point of the counter 52. In the example discussed herein wherein each counter 52 comprises two (2) bits, the predetermined maximum value may be three (3). Assume for the purposes of illustration that the counter 52A to which the tag and set index map is at the predetermined maximum value. The cache filter 22 sets the saturation bit in the saturation bit field 88 associated with the counter 52A (block 204). The cache filter 22 does not increment the counter 52A, but leaves the counter 52A saturated.

Assume that the cache 20 deletes or otherwise invalidates a cache line in the cache 20. The cache filter 22 receives a delete entry signal 86 including the tag and set index of the cache line being deleted (FIG. 7, block 300). The mapping functions 48 in the cache filter 22 map the tag and set index to counters 52 in the respective counter arrays 50 (block 302). The process described herein will now be described with respect to a particular counter 52; however, it will be appreciated that each counter 52 will undergo the same process. A first counter 52 to which the tag and set index mapped is decremented (blocks 304, 306). The associated saturation bit in the saturation bit field 88 is examined to determine if the saturation bit is set (block 308). If the saturation bit is not set, i.e., the saturation bit has a value of zero, the process determines whether another counter 52 needs to be processed (block 310). If the saturation bit is set, then it is determined if the counter 52 is at a predetermined minimum value, such as zero (block 314). If not, the process determines whether another counter 52 needs to be processed (block 310).

If at block 314 the counter 52 is determined to be at the predetermined minimum value, the cache filter 22 sends the cache 20 a request, illustrated in FIG. 5 as a provide count signal 90, that includes a reference to the counter 52, and that requests that the cache 20 provide a count of the total number of cache lines that map to the counter 52 (block 316). For example, the provide count signal 90 includes the six (6) bit set index field 44 of the input 40 causing the counter 52 to be decremented to a value of zero, and the particular four (4) bit field of the tag field 42 (illustrated as 'SubTagN[X+3:X]' in the provide count signal 90) used by that respective mapping function 48. The provide count signal 90 thus references the respective counter 52 that is at the predetermined minimum value. The cache 20 receives the provide count signal 90 and determines the number of cache lines in the cache 20 that map to the identified counter 52, and responds to the provide count signal 90 with a count signal 92 containing the number of all cache lines that map to the counter 52. The count signal 92 may include updating a memory location, such as the register 87, with the count of the cache lines in the cache 20 that map to the identified counter 52, and setting the register 87 as valid. The cache filter 22 may await notification that the register 87 contains valid data, and upon such notification or determination, obtain the count value from the register 87 (block 318). The cache filter 22 determines if the count is greater than a predetermined maximum value, for example, a saturation point of the counter 52 (block 320). If the count is not greater than the maximum predetermined value, the counter 52 is modified by setting the counter 52 to be the value of the count, and the saturation bit is reset (block 322). If the counter is greater than the maximum predetermined value, the counter 52 is modified by setting the counter 52 to be the maximum predetermined value, and the saturation bit is not reset (block 324). It is then determined whether additional counters need to be processed (block 310), and if not, the process associated with the delete entry signal 86 is finished. Otherwise, the process described herein is repeated for each additional counter 52.

As described herein, the embodiments enable a filter to process snoop probes efficiently, and in a relatively small amount of memory. The embodiments decrease false positive determinations compared to filters that merely allow a counter to saturate, reducing power utilized by the cache to process snoop probes that identify cache lines that are not contained in the cache, and increasing cache throughput. The embodiments use less memory than mechanisms that use counter sizes sufficient to contain the maximum number of cache lines that can be stored in the cache.

The filters and methods disclosed herein can be employed in any application desiring cache coherency between multiple caches. Further, the filter, circuits, or functional blocks according to the designs and processes discussed herein may be included or integrated in a semiconductor die, integrated circuit, and/or device, including an electronic device. Examples of such devices in which the filters, circuits, or functional blocks may be included are, without limitation, a set top box, an entertainment unit, a navigation device, a communications device, a personal digital assistant (PDA), a fixed location data unit, a mobile location data unit, a mobile phone, a cellular phone, a computer, a portable computer, a desktop computer, a monitor, a computer monitor, a television, a tuner, a radio, a satellite radio, a music player, a digital music player, a portable music player, a video player, a digital video player, a digital video disc (DVD) player, and a portable digital video player.

Figure 8:
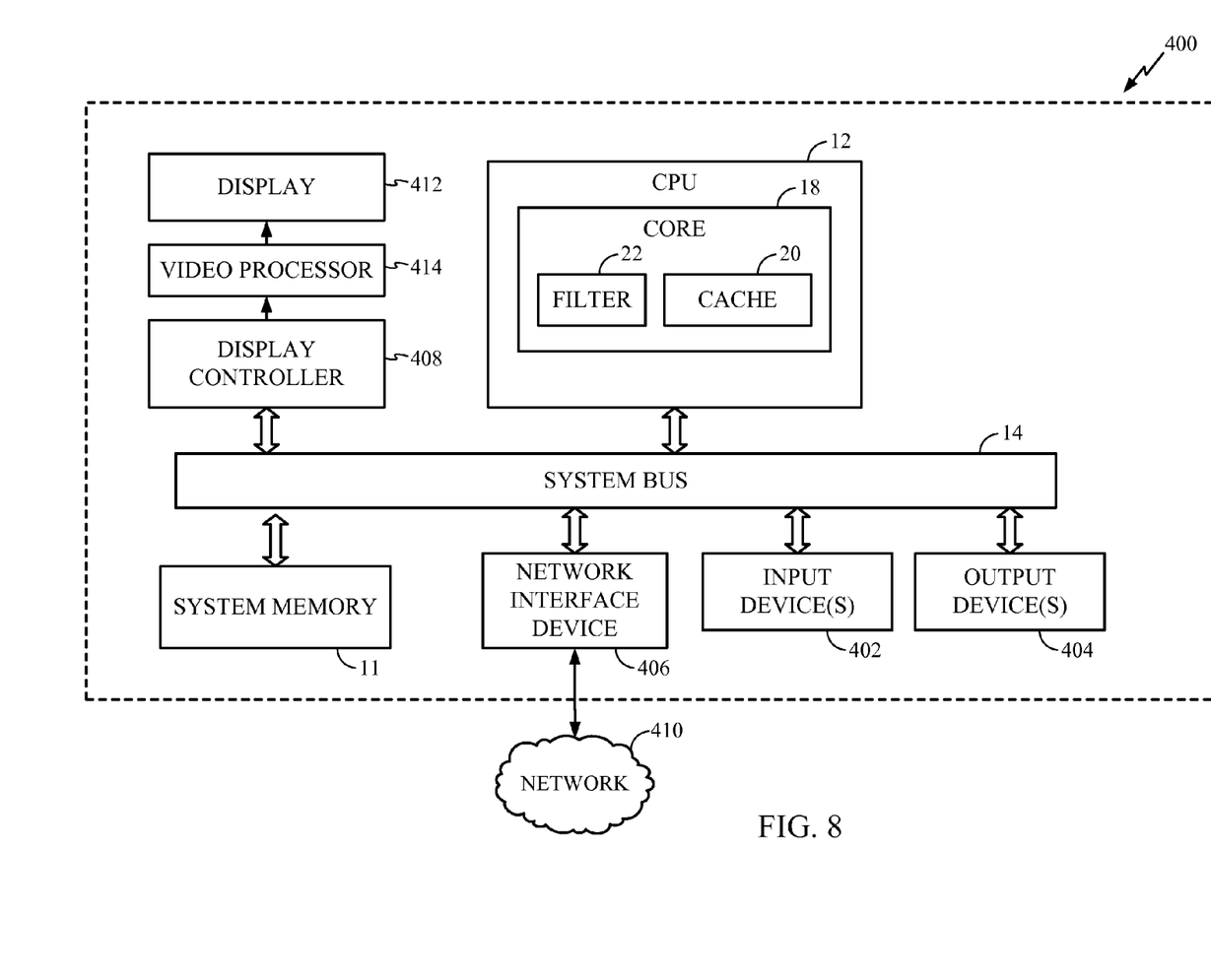
FIG. 8 is a block diagram of an exemplary CPU-based system employing a cache filter according to embodiments disclosed in the detailed description.

FIG. 8 is a block diagram of an exemplary processor-based system 400 employing a cache filter according to embodiments disclosed in the detailed description. The processor-based system 400 may be included in any circuit, semiconductor die or dies, or an electronic device, including but not limited to those referenced above. In this example, the processor-based system 400 includes a central processing unit (CPU) 12 that includes a core 18 that further includes a cache 20 and cache filter 22. The CPU 12 is coupled to the system bus 14, which intercouples other devices included in the processor-based system 400. As is known, the CPU 12 communicates with such other devices by exchanging address, control, and data information over the system bus 14. Such devices can include any types of devices. As illustrated in FIG. 8, these devices can include system memory 11, one or more input devices 402, one or more output devices 404, a network interface device 406, and a display controller 408, as examples.

The one or more input devices 402 can include any type of input device, including but not limited to input keys, switches, voice processors, etc. The one or more output devices 404 can include any type of output device, including but not limited to audio, video, other visual indicators, etc. The network interface device 406 can be any device configured to allow exchange of data to and from a network 410. The network 410 can be any type of network, including but not limited to a wired or wireless network, private or public network, a local area network (LAN), a wide local area network (WLAN), and the Internet. The network interface device 406 can support any type of communication protocol desired. The CPU 12 can access the system memory 11 over the system bus 14.

The CPU 12 can also access the display controller 408 over the system bus 14 to control information sent to a display 412. The display controller 408 sends information to the display 412 to be displayed via a video processor 414, which processes the information to be displayed into a format suitable for the display 412. The display 412 can include any type of display, including but not limited to a cathode ray tube (CRT), a liquid crystal display (LCD), a plasma display, etc.

Those of skill in the art will appreciate that the various illustrative logical blocks, modules, circuits, and algorithm steps described in connection with the embodiments disclosed herein can be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein can also be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

It is noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A filter, comprising: a controller coupled to a cache memory storing a collection of cache lines and adapted to: receive an input referencing a first cache line and a status indication indicating a change in membership status of the first cache line in the collection of cache lines; and make a determination that a counter, associated with the first cache line reached a predetermined value, wherein a mapping function maps more than one input referencing a cache line in the collection of cache lines to the same counter; and in response to the determination: send a request to the cache memory storing the collection of cache lines, wherein the request includes a reference to the counter; receive a first response from the cache memory in response to the request; delete a second cache line from the collection of cache lines; and modify the counter in response to the first response indicating that an item has been deleted from the collection of items.

2. The filter of claim 1 wherein the status indication comprises an indication that the first cache line referenced by the input is being added to the collection of cache lines.

3. The filter of claim 2 wherein the predetermined value comprises a maximum value that can be maintained in the counter.

4. The filter of claim 3 wherein the request comprises a request to the cache memory to delete the second cache line in the collection of cache lines items that maps to the counter.

5. The filter of claim 4 wherein the first response comprises a second address referencing the second cache line and a second status indication indicating the cache line referenced by the second address is being deleted from the collection of cache lines.

6. The filter of claim 5 wherein the filter is adapted to decrement the counter based on the first response.

7. The filter of claim 1 wherein the status indication indicating the change in the membership status of the item comprises an indication that the second cache line is being deleted from the collection of cache lines.

8. The filter of claim 7 wherein the predetermined value comprises a minimum value that can be maintained in the counter.

9. The filter of claim 8 wherein the request comprises a request to the cache memory to provide the controller a count of the number of cache lines that map to the counter.

10. The filter of claim 9 wherein the first response comprises the count of the number of cache lines in the collection of cache lines that map to the counter.

11. The filter of claim 10 wherein the filter is further adapted to set a value of the counter equal to the count based on the first response.

12. The filter of claim 10 wherein the filter is adapted to determine if the count is greater than a predetermined maximum value, and if so, to set a value of the counter to the predetermined maximum value to modify the one or more counters based on the first response.

13. The filter of claim 12 wherein the filter is further adapted to reset a saturation bit associated with the counter if the count is not greater than the predetermined maximum value.

14. The filter of claim 1 integrated in at least one semiconductor die.

15. The filter of claim 1 further comprising a device, selected from the group consisting of a set top box, an entertainment unit, a navigation device, a communications device, a personal digital assistant (PDA), a fixed location data unit, a mobile location data unit, a mobile phone, a cellular phone, a computer, a portable computer, a desktop computer, a monitor, a computer monitor, a television, a tuner, a radio, a satellite radio, a music player, a digital music player, a portable music player, a video player, a digital video player, a digital video disc (DVD) player, and a portable digital video player, into which the filter is integrated.

16. The filter of claim 1, wherein adapted to make the determination that the counter associated with the address reached the predetermined value comprises the controller adapted to: maintain an array of counters; and generate an index to the associated counter among the array of counters, based on a mapping of the input.

17. The filter of claim 16, wherein adapted to receive the input comprises the controller adapted to receive the input having a tag field and a set index field, and wherein the mapping of the input comprises appending the sub-tag to the set index field, and wherein the reference to the counter included in the request sent to the cache memory comprises the sub-tag.

18. The filter of claim 1, wherein the controller adapted to receive the input comprises the controller adapted to receive the input having a tag field and a set index field, and wherein the mapping of the input is based, at least in part, on a sub-tag, the sub-tag being a sub-field of the tag.

19. The filter of claim 18, wherein the reference to the counter included in the request sent to the cache memory comprises the sub-tag.

20. The filter of claim 1, wherein adapted to make the determination that the counter associated with the input reached the predetermined value comprises the controller adapted to: maintain a first mapping function adapted to generate a first index and a second mapping function adapted to generate a second index respectively, based on the input; maintain a first array of counters, identified by the first index, associated with the first mapping function and a second array of counters, identified by the second index, associated with the second mapping function; apply the first mapping function and the second mapping to the input to generate, respectively, the first index and the second index; and determine if a counter in the first array of counters identified by the first index, or if a counter in the second array of counters identified by the second index reached the predetermined value.

21. The filter of claim 20, wherein adapted to receive the input comprises the controller adapted to receive the input having a tag field and a set index field, wherein the first mapping function is based, at least in part, on a first sub-tag, the first sub-tag being a first sub-field of the tag field, and wherein the second mapping function is based, at least in part, on a second sub-tag, the second sub-tag being a second sub-field of the tag field.

22. The filter of claim 21, wherein the reference to the counter references the counter identified by the first index in the first array of counters, and wherein the reference includes the first sub-tag.

23. The filter of claim 22, wherein the predetermined value is a maximum value, and wherein the request comprises a request to the cache memory to delete a cache line in the collection of cache lines that, based at least in part on the first sub-tag included in the request, maps to the counter identified by the first index in the first array of counters.

24. The filter of claim 23, wherein the first response comprises the second cache line and a second status indication indicating the second cache line is being deleted from the collection of cache lines.

25. the filter of claim 24, wherein the filter is adapted to decrement the first counter based on the first response, and to apply the second mapping to the second address to generate another second index, and to decrement the counter in the second array indexed by the another second index.

26. The filter of claim 22, wherein the predetermined value is a minimum value.

27. The filter of claim 26, wherein the request comprises a request to the cache memory to provide the controller a count of the number of cache lines that, based at least in part on the first sub-tag included in the request, map to said counter identified by the first index in the first array of counters.

28. The filter of claim 27, wherein the controller is adapted to set a value of the counter identified by the first index in the first array of counters to a count based on the first response.

29. The filter of claim 28, wherein based on the first response includes the filter determining if the count is greater than a predetermined maximum value, and if so, setting a value of the counter identified by the first index in the first array of counters to the predetermined maximum value.

30. The filter of claim 28, wherein based on the first response includes the filter determining if the count is greater than a predetermined maximum value, and if not greater, resetting a saturation bit associated with the counter identified by the first index in the first array of counters to the predetermined maximum value.

31. A filter, comprising: means for receiving an input referencing a first cache line and a status indication indicating a change in membership status of the cache line in a collection of cache lines items; means for making a determination that a counter associated with the address item reached a predetermined value wherein a mapping function maps more than one input referencing a cache line, in the collection of cache lines, to the same counter; and means in response to the determination, for: sending a request to the cache memory storing the collection of cache lines, wherein the request includes a reference to the counter items; receiving a first response from the cache memory in response to the request; delete a second cache line from the collection of cache lines; and modifying the counter in response to the first response indicating that an item has been deleted from the collection of cache lines.

32. The filter of claim 31 wherein the status indication comprises an indication that the cache line referenced by the address is being added to the collection of cache lines.

33. The filter of claim 31 wherein the status indication comprises an indication that the first cache line referenced by the input is being deleted from the cache memory stored collection of cache lines.

34. The filter of claim 31, wherein means for making the determination that the counter associated with the address reached the predetermined value is configured to maintain an array of counters, and to generate an index to the associated counter among the array of counters, based on a mapping of the address.

35. The filter of claim 34, wherein means for receiving the input is adapted to receive the input having a tag field and a set index field, and wherein mapping of the input comprises appending the sub-tag to the set index field, and wherein the reference to the counter included in the request sent to the cache memory comprises the sub-tag.

36. The filter of claim 31, wherein means for receiving the input is configured to receive the input having a tag field and a set index field, and wherein mapping of the address is based, at least in part, on a sub-tag, the sub-tag being a sub-field of the tag.

37. The filter of claim 36, wherein means for making a determination that a counter associated with the input reached the predetermined value is configured to include the reference to the counter included in the request sent to the cache memory comprises the sub-tag.

38. The filter of claim 31, wherein means for making the determination that the counter associated with the input reached the predetermined value is configured to: apply a first mapping function to the address to generate a first index, and apply a second mapping function to generate a second index; identify, based on the first index, a counter in a first array of counters associated with the first mapping function, and identify, based on a second index, a counter in a second array of counters associated with the second mapping function; and determine if the counter in the first array of counters identified by the first index, or if the counter in the second array of counters identified by the second index reached the predetermined value.

39. The filter of claim 38, wherein means for receiving the input is configured to receive the address having a tag field and a set index field, wherein the first mapping function is based, at least in part, on a first sub-tag, the first sub-tag being a first sub-field of the tag field, and wherein the second mapping function is based, at least in part, on a second sub-tag, the second sub-tag being a second sub-field of the tag field.

40. The filter of claim 39, wherein in response to determining the counter identified by the first index in the first array of counters reached the predetermined value, the reference to the counter references the counter identified by the first index in the first array of counters, and wherein the reference includes the first sub-tag.

41. The filter of claim 40, wherein the predetermined value is a maximum value, and wherein the request comprises a request to the cache memory to delete the second cache line in the collection of cache lines that, based at least in part on the first sub-tag included in the request, maps to the counter identified by the first index in the first array of counters.

42. The filter of claim 41, wherein the first response comprises a second a cache line and a second status indication indicating the cache line referenced by the second address is being deleted from the collection of cache lines.

43. the filter of claim 42, wherein the filter is adapted to decrement the first counter and to apply the second mapping to the second cache line to generate another second index, and to decrement the counter in the second array indexed by the another second index.

44. The filter of claim 40, wherein the predetermined value is a minimum value.

45. The filter of claim 44, wherein the request comprises a request to the cache memory to provide the controller a count of the number of cache lines that, based at least in part on the first sub-tag included in the request, map to said counter identified by the first index in the first array of counters.

46. The filter of claim 45, wherein the controller is adapted to set a value of the counter identified by the first index in the first array of counters to a count based on the first response.

47. The filter of claim 46, wherein based on the first response includes the filter determining if the count is greater than a predetermined maximum value, and if so, setting a value of the counter identified by the first index in the first array of counters to the predetermined maximum value.

48. The filter of claim 46, wherein based on the first response includes the filter determining if the count is greater than a predetermined maximum value, and if not greater, resetting a saturation bit associated with the counter identified by the first index in the first array of counters to the predetermined maximum value.

49. A method for filtering, comprising: receiving an input referencing a first cache line an item and a status indication indicating a change in membership status of the first cache line in a collection of cache lines; and making a determination that a counter associated with the input reached a predetermined value, and in response to the determination: wherein a mapping function maps more than one input referencing a cache line, in the collection of cache lines, to the same counter: sending a request including a reference to the counter to the cache memory storing the collection of cache lines, wherein the request includes a reference to the counter items; receiving a first response from the cache memory in response to the request; deleting a second cache line from the collection of cache lines; and modifying the counter in response to the first response indicating that an item has been deleted from the collection of cache lines.

50. The method of claim 49 wherein the status indication indicating the change in the membership status of the first cache line item comprises an indication that the first cache line is being added to the collection of cache lines items, the predetermined value comprises a maximum value that can be maintained in the counter, and the request comprises a request to delete a cache line an item in the collection of cache lines items that maps to the counter.

51. The method of claim 49 wherein the status indication indicating the change in the membership status of the first cache line comprises an indication that the second cache line item is being deleted from the collection of cache lines, the predetermined value comprises a minimum value that can be maintained in the counter, and the request comprises a request to provide a count of a number of cache lines items in the collection of cache lines that map to the counter.

52. The method of claim 49, wherein making the determination that the counter associated with the input reached the predetermined value comprises: generating a first index based on a first mapping function applied to the input, and generating a second index based on a second mapping function applied to the input; identifying, based on the first index, a counter in a first array of counters associated with the first mapping function, and identifying, based on a second index, a counter in a second array of counters associated with the second mapping function; and determining if the counter in the first array of counters identified by the first index, or if the counter in the second array of counters identified by the second index reached the predetermined value.

53. The method of claim 52, wherein receiving the input includes receiving the input having a tag field and a set index field, wherein the first mapping function is based, at least in part, on a first sub-tag, the first sub-tag being a first sub-field of the tag field, and wherein the second mapping function is based, at least in part, on a second sub-tag, the second sub-tag being a second sub-field of the tag field.

54. The method of claim 53, wherein the reference to the counter references the counter identified by the first index in the first array of counters, and wherein the reference includes the first sub-tag.

55. The method of claim 54, wherein the predetermined value is a minimum value.

56. The method of claim 55, wherein the request comprises a request to the cache memory to provide the controller a count of the number of cache lines that, based at least in part on the first sub-tag included in the request, map to said counter identified by the first index in the first array of counters.

57. The method of claim 56, wherein the method further comprises setting a value of the counter identified by the first index in the first array of counters to a count based on the first response.

58. The method of claim 57, wherein based on the first response includes determining if the count is greater than a predetermined maximum value, and if so, setting a value of the counter identified by the first index in the first array of counters to the predetermined maximum value.

59. The method of claim 57, wherein based on the first response includes determining if the count is greater than a predetermined maximum value, and if not greater, resetting a saturation bit associated with the counter identified by the first index in the first array of counters to the predetermined maximum value.

60. The method of claim 53, wherein the predetermined value is a maximum value, and wherein the request comprises a request to the cache memory to delete a cache line in the collection of cache lines that, based at least in part on the first sub-tag included in the request, maps to the counter identified by the first index in the first array of counters.

61. The method of claim 60, wherein the first response comprises referencing the second cache line and a second status indication indicating the cache line referenced by the second address is being deleted from the collection of cache lines.

62. The method of claim 61, wherein the method further includes decrementing the first counter, applying the second mapping to the second address to generate another second index, and decrementing the counter in the second array indexed by the another second index.

63. A method for filtering, comprising the steps of: step of receiving an input referencing a first cache line and a status indication indicating a change in membership status of the first cache line in collection of cache lines; step of making a determination that a counter associated with the item reached a predetermined value; wherein a mapping function maps more than one input referencing a cache line in the collection of cache lines, to the same counter; step of deleting a second cache line from the collection of cache lines and step, in response to the making the determination, of sending a request to the cache memory storing the collection of cache lines, wherein the request includes a reference to the counter response indicating that an item has been deleted from the collection of cache lines; receiving a first response from the cache memory in response; and modifying the counter in response to the first response.

64. A non transitory computer readable tangible medium embodying computer executable instructions for controlling a device to implement a method for filtering, the method comprising: receiving an input referencing a cache line and a status indication indicating a change in membership status of the cache line in the cache memory stored collection of cache lines; and making a determination that a counter associated with the input reached a predetermined value, and in response to the determination: wherein a mapping function maps more than one input referencing a cache line, in the collection of cache lines, to the same counter; sending a request to the cache memory storing the collection of cache lines, wherein the request includes a reference to the counter; receiving a first response from the cache memory in response to the request; deleting a second cache line from the collection of cache lines; and modifying the counter in response to the first response indicating that an item has been deleted from the collection of cache lines.

65. The non transitory computer readable tangible medium of claim 64 wherein the status indication indicating the change in the membership status of the cache line comprises an indication that the first cache line is being added to the collection of cache lines, the predetermined value comprises a maximum value that can be maintained in the counter, and the request comprises a request to delete a second cache line in the collection of cache lines that maps to the counter.

66. The non transitory computer readable tangible medium of claim 65, wherein the status indication indicating the change in the membership status of the first cache line comprises an indication that the cache line is being deleted from the collection of cache lines, the predetermined value comprises a minimum value that can be maintained in the counter, and the request comprises a request to provide a count of a number of cache lines in the collection of cache lines that map to the counter.

* * * * *